US012665950B2

(12) United States Patent
Gayer et al.

(10) Patent No.: US 12,665,950 B2
(45) Date of Patent: Jun. 23, 2026

(54) CENTRALIZED IoT DASHBOARD

(71) Applicant: CMC Group, Inc., Bowling Green, OH (US)

(72) Inventors: Jeffrey C. Gayer, Sylvania, OH (US); Vishal Anumolu, Bowling Green, OH (US); Jill Marie Carte, Fostoria, OH (US)

(73) Assignee: CMC GROUP, INC., Bowling Green, OH (US)

( * ) Notice: Subject to any disclaimer, the term of this patent is extended or adjusted under 35 U.S.C. 154(b) by 47 days.

(21) Appl. No.: 19/001,741

(22) Filed: Dec. 26, 2024

(65) Prior Publication Data

US 2025/0227151 A1 Jul. 10, 2025

Related U.S. Application Data

(60) Provisional application No. 63/617,649, filed on Jan. 4, 2024.

(51) Int. Cl.
| | |
|---|---|
| *G06F 9/54* | (2006.01) |
| *G06Q 10/087* | (2023.01) |
| *G06Q 10/20* | (2023.01) |
| *H04L 9/40* | (2022.01) |
| *H04L 67/125* | (2022.01) |

(52) U.S. Cl.
CPC ............ *H04L 67/125* (2013.01); *G06F 9/547* (2013.01); *G06Q 10/087* (2013.01); *G06Q 10/20* (2013.01); *H04L 63/105* (2013.01)

(58) Field of Classification Search
CPC ..... H04L 67/125; H04L 63/105; G06F 9/547; G06Q 10/087; G06Q 10/20
See application file for complete search history.

(56) References Cited

U.S. PATENT DOCUMENTS

| | | | | |
|---|---|---|---|---|
| 9,967,343 | B2 * | 5/2018 | Kim ...................... | G06F 9/5061 |
| 11,475,761 | B2 * | 10/2022 | Reddy ................... | H04L 67/125 |
| 2012/0130513 | A1 | 5/2012 | Hao et al. | |
| 2014/0244768 | A1 | 8/2014 | Shuman et al. | |
| 2018/0015831 | A1 | 1/2018 | Rozman et al. | |
| 2018/0089455 | A1 * | 3/2018 | Castinado ............. | H04W 12/08 |

* cited by examiner

*Primary Examiner* — Amie C. Lin
(74) *Attorney, Agent, or Firm* — Shumaker, Loop & Kendrick, LLP; James D. Miller

(57) ABSTRACT

A web-based system and database for storing data from internet-connected smart devices used by commercial kitchens and food service businesses, along with a corresponding mobile application for displaying the data on configurable dashboard screens. Data for smart devices from many different manufacturers are viewable in the system, where an interface gateway for each different device manufacturer communicates through an API layer to the system in the cloud. Each smart device displays data in a widget, such as a bar graph or a line graph. Pre-configured and user-configurable dashboards include multiple widgets displaying the data for multiple devices, including devices of different types and manufacturers. Commands such as changing a set point temperature may be sent to devices by authorized users of the mobile app. Push notifications are also provided when a device needs attention, and user roles define authorization for functions such as adding and controlling devices.

13 Claims, 8 Drawing Sheets

510

522

520

530

CENTRALIZED IoT DASHBOARD

CROSS-REFERENCE TO RELATED APPLICATIONS

This application claims the benefit of the priority date of U.S. Provisional Patent Application Ser. No. 63/617,649, titled CENTRALIZED IOT DASHBOARD, filed Jan. 4, 2024.

BACKGROUND

Field

The present disclosure relates generally to a computer system and mobile application for managing data from internet-connected devices. More particularly, it relates to a web-based system and database for storing data from internet-connected devices such as those used by commercial kitchens and food service businesses, along with a corresponding mobile application for displaying the data on configurable dashboard screens. Push notifications are also provided when a device needs attention, and user roles define authorization for functions such as adding and controlling devices.

Discussion of the Related Art

As internet access and WiFi networks became widely available, the concept of an "Internet of Things" (IoT) emerged. The basic idea behind the IoT is that any processor-controlled device could be given a WiFi transceiver and thereby become "smart"—sending information to and receiving information from the internet. Many different types of smart devices are now commonplace—such as refrigerators, thermostats, light switches, door locks and garage door openers, and so forth.

Many restaurants and other companies in the food service industry have adopted internet-connected devices in their business operations. Smart devices in the food service industry include things like refrigerators and freezers, ovens and thermostats. These internet-connected devices generate a large amount of data describing operational performance parameters of the devices. This data provides the opportunity for many insights into a company's business operations, but the volume of data also creates challenges in how to manage it.

A first fundamental problem with internet-connected devices at a restaurant, for example, is that every different device type and every different brand of device tends to have its own mobile application ("app") for viewing the data generated by the device. For example, an IoT oven would only enable data viewing in its own app, which is different from the app provided for an IoT freezer. Furthermore, if two different brands of IoT ovens are used in a restaurant, they would each use a different app. This proliferation of apps quickly becomes untenable when many IoT devices are used in an individual restaurant, not to mention across multiple restaurants in a chain.

Another problem is that, even if all of the different apps are installed and data for all of the devices is available to a restaurant manager, the data may be incomprehensible to the manager due to the variety of formats in which it is displayed. This problem is further compounded when considering the desire to analyze data to understand the business's operational metrics. Downloading data from each device's app to a spreadsheet and compiling all of this data into a common format represents a huge amount of non-value-added work, and introduces opportunities for error.

Furthermore, IoT devices that provide notification of an alarm, a reorder point, or periodic maintenance point, have no manner of automatically launching a task assignment (in a centralized task management dashboard) to carry out the process which remedies the application alarm/notification, thus increasing the likelihood that the required task is never completed, and also missing an opportunity for organizational productivity improvement.

Data from smart devices in restaurants and other food service businesses can be used in many other productive ways as well—such as automatically triggering notifications when a device is measuring a parameter which is outside a defined operational range (e.g., a freezer above 10° F.), and providing customized views of data to people in different roles and levels within an organization (e.g., line cook vs. store manager vs. regional manager). However, with existing device- and brand-specific apps, each of these potentially valuable uses for IoT device data becomes extremely complex and labor-intensive.

In view of the circumstances described above, there is a need for a centralized database system which enables simple and efficient collection of IoT device data across multiple brands and device types, and consumption of that data via a single common mobile app.

SUMMARY

The present disclosure describes a web-based system and database for storing data from internet-connected smart devices used by commercial kitchens and food service businesses, along with a corresponding mobile application for displaying the data on configurable dashboard screens. Data for smart devices from many different manufacturers may be viewed in the system, where an interface gateway for each different device manufacturer communicates through an API layer to the system in the cloud. Each smart device displays data in a widget, such as a bar graph or a line graph. Pre-configured and user-configurable dashboards include multiple widgets displaying the data for multiple devices, which may be of different types and manufacturers. Commands such as changing a set point temperature may be sent to devices by authorized users of the mobile app. Push notifications are also provided when a device needs attention, and user roles define authorization for functions such as adding and controlling devices.

Additional features of the present disclosure will become apparent from the following description and appended claims, taken in conjunction with the accompanying drawings.

DETAILED DESCRIPTION OF THE EMBODIMENTS

The following discussion of the embodiments of the disclosure directed to a centralized Internet Of Things (IoT) dashboard system is merely exemplary in nature, and is in no way intended to limit the invention or its applications or uses.

The present disclosure describes an internet-based and app-enabled IoT dashboard system which is designed to streamline and simplify the management and understanding of data from IoT devices. The centralized IoT dashboard system disclosed herein has particular application to smart devices used by restaurants and food service companies, and many examples in this context are discussed below. However, it should be understood that the disclosed IoT dashboard system is applicable to any type of smart device in any environment—including residential environments with devices such as thermostats, appliances and door locks, and commercial environments with any type of industry-specific smart devices.

Throughout the ensuing discussion of the centralized IoT dashboard system and the associated processes, the following terms and definitions will be used:

Device (a.k.a., smart device, or IoT device)—a physical device which measures data and may also include an automatically-controlled electrical/mechanical appliance; devices include a processor and a transceiver (e.g., WiFi) for sending and receiving information such as data and control commands Device data—data which is recorded by a device and transmitted to a computer for storage and viewing; device data typically describes operating parameters of the device (e.g., temperature)

Figure 1:
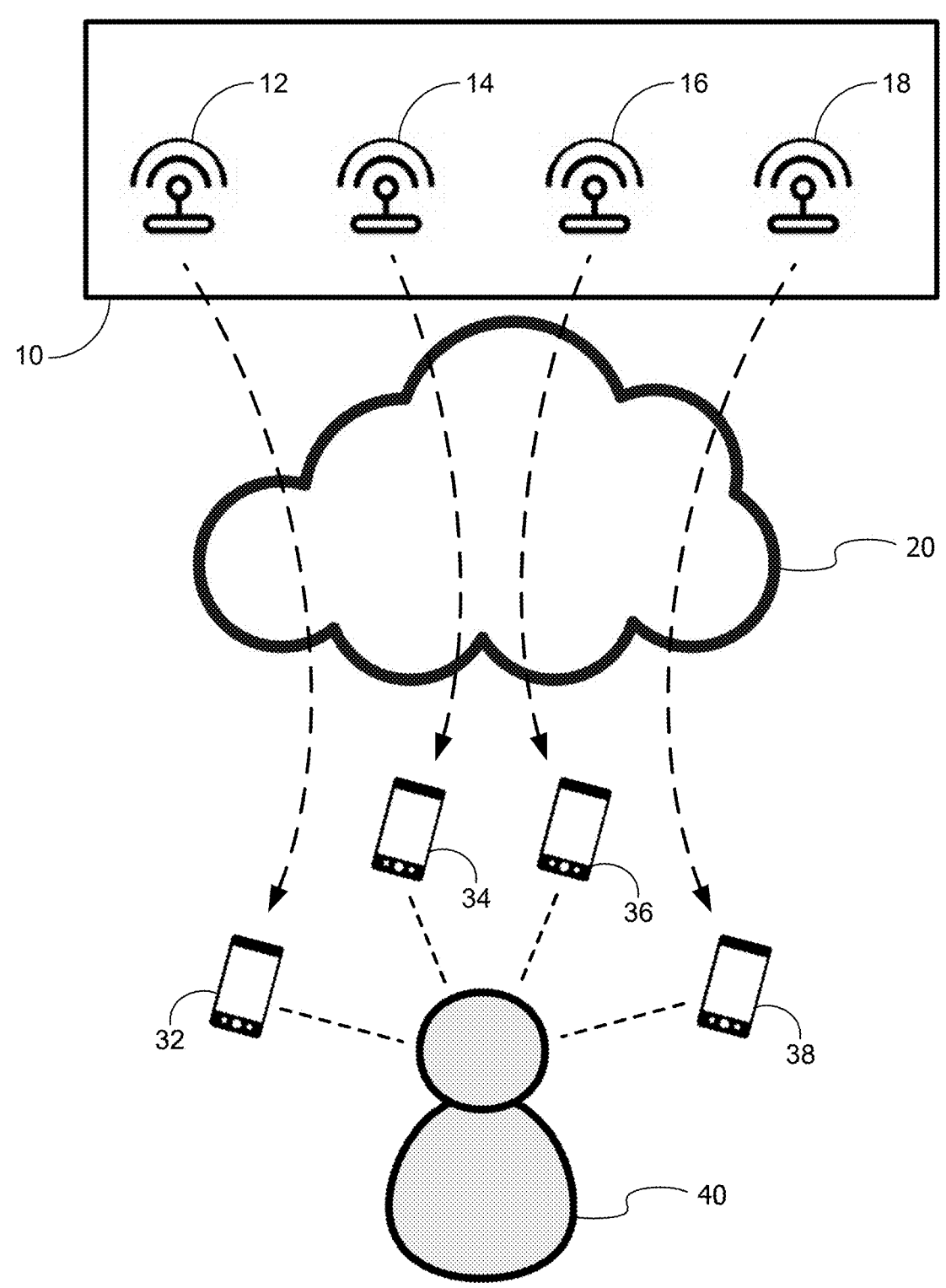
FIG. 1 is an illustration of a business having a plurality of internet-connected devices, each of which uses its own proprietary data gateway and mobile application for data viewing and device control, as known in the art.

Company—an organization which uses smart devices, including smart devices from multiple manufacturers, and needs convenient access to the device data Site—a particular building or location of the company; for example, one restaurant in a chain FIG. 1 is an illustration of a business having a plurality of internet-connected devices, each of which uses its own proprietary data gateway and mobile application for data viewing and device control, as known in the art. In the simple scenario of FIG. 1, a business has a building 10 where a number of smart devices (12-18) are in operation. The building 10 may be a restaurant, for example, and the smart devices may include appliances such as one or more refrigerators, freezers, ovens, fryers, etc.

Each of the smart devices 12-18 records and communicates data for remote viewing. Typically, each of the smart devices 12-18 is configured to access the internet via a local WiFi network running in the building 10. In this way, each of the devices 12-18 communicates data to "the cloud" 20 (the internet) where a device-specific cloud-based system stores the data and makes it available to a mobile device upon proper authentication.

In this example, the smart device 12 uploads data to the cloud 20, where a cloud-based system specific to the maker of the device 12 processes the data. A mobile device running a mobile application ("app") 32, having properly identified and authenticated the smart device 12, displays data from the smart device 12. A user 40, who may be anywhere in the world with internet access, may view the data from the smart device 12.

The scenario described above works fine for one or two smart devices. However, when many smart devices are used in a business operation such as a restaurant, the proliferation of mobile apps quickly becomes untenable. In the example of FIG. 1, the smart device 14 uploads data to the cloud 20 which is only viewable via a mobile app 34. Likewise, the smart device 16 uploads data which is only viewable via a mobile app 36, and the smart device 18 uploads data which is only viewable via a mobile app 38. The user 40 does not need to have multiple mobile phones, of course. But still, the need for each user in a company to have a different mobile app for each type or brand of smart device is extremely inefficient, where each manufacturer's mobile app has a different user interface to learn, and the data about all of the smart devices cannot be viewed and analyzed in aggregate.

In view of the proliferation of internet-connected devices, the scenario depicted in FIG. 1 is very typical in real world businesses. For example, one business operator has a commercial kitchen operating in a convenience store business with 15 smart appliances including fryers, ovens, thermostats, walk-in coolers, HVAC, and beverage dispensers. The store manager is supposed to manage all the internet-connected devices' notifications through multiple apps on a mobile device, which is just not practical or efficient.

In another example, a business has a mid-size commercial kitchen to serve the fine dining industry with four types of smart appliances, including refrigerators, soup heaters, cooktops, and water management systems. The kitchen has more than one of some of the appliances, as kitchen operations demand parallel workloads for faster customer service. However, the business has to manage multiple versions of the same appliances in apps which don't support aggregate viewing of multiple devices.

FIG. 1 illustrates an example of a business with a single building and only a handful of smart devices, while the examples discussed above illustrate the types of inefficiencies encountered in real world businesses. The situation becomes even more unmanageable when dozens of smart devices are used at a site, and the business operates multiple sites. The system of the present disclosure has been developed to overcome the problems experienced by businesses which use existing decentralized systems for managing smart devices and their data.

Figure 2:
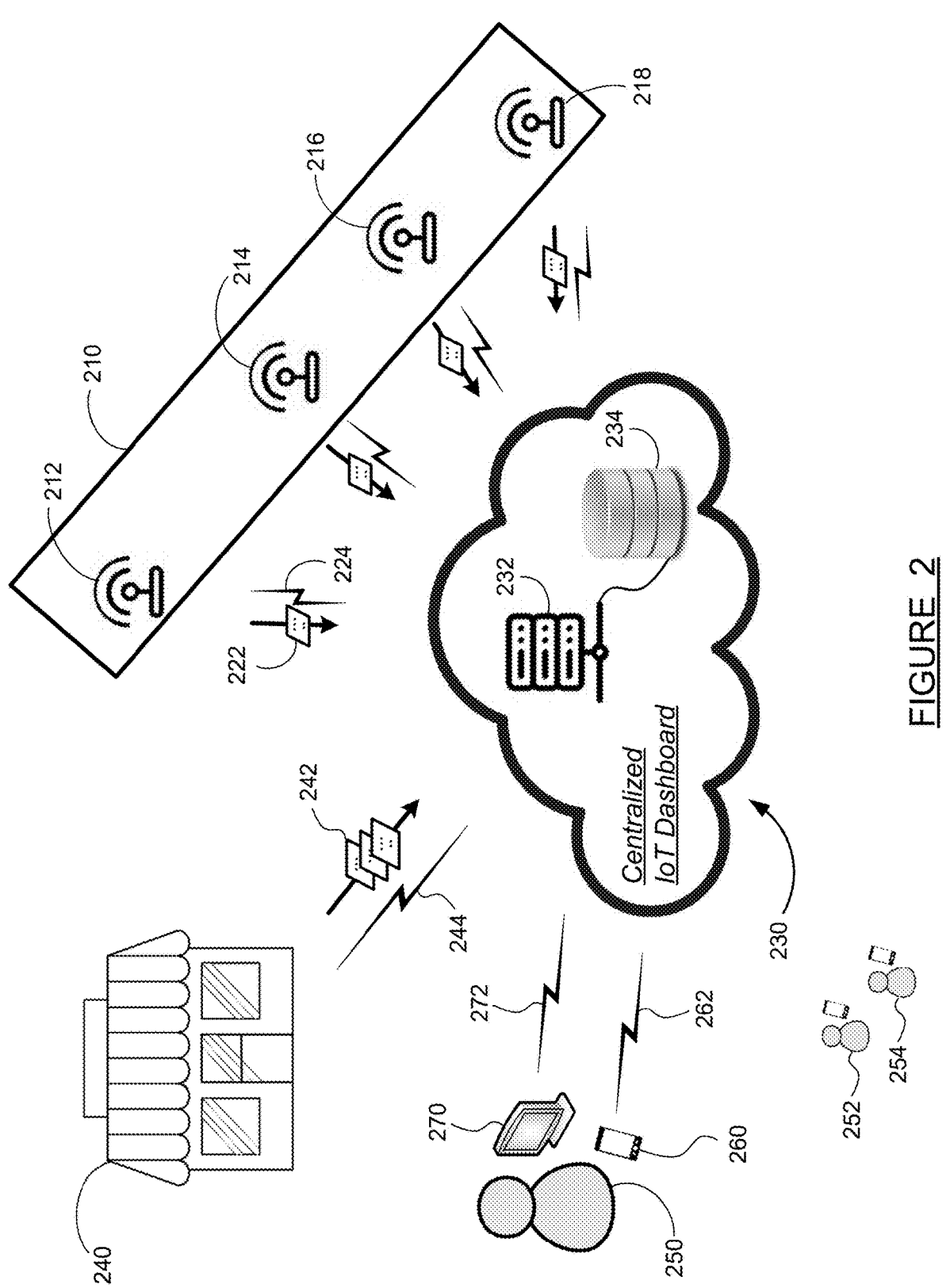
FIG. 2 is a block diagram illustration of a system architecture for a centralized IoT dashboard system, depicting multiple internet-connected devices at multiple locations providing data to a centralized database with access from a single mobile application, according to an embodiment of the present disclosure.

FIG. 2 is a block diagram illustration of a system architecture for a centralized IoT dashboard system, depicting multiple internet-connected devices at multiple locations providing data to a centralized database with access from a single mobile application, according to an embodiment of the present disclosure. A first building 210 is operated by a business, such as a food service company. A plurality of smart devices (212-218) are running in the building 210. Each of the smart devices 212-218 is configured to communicate data to/from the internet, typically via a WiFi network running in the building 210, in the same manner described earlier with respect to FIG. 1. However, this is where the similarity with prior art techniques ends.

The smart device 212 sends its operating parameter data to the cloud (internet), as indicated by an arrow 222. The smart device 212 also has two-way communication with the cloud, for other purposes in addition to the normal data upload, as indicated by a communication link 224. The communication link 224 may be used for sending control commands to the smart device 212 by a user (e.g., to change a refrigerator set point temperature), or sending a notification message from the smart device 212 to a user (e.g., notification that a device malfunction has been detected). These capabilities will be discussed further below. Each of the other smart devices 214-218 has the same communication capabilities as the device 212, as depicted in FIG. 2 (with reference numerals omitted to reduce drawing clutter).

A centralized IoT dashboard system 230 receives the data from and handles other two-way communication with the smart devices 212-218. The system 230 includes a server computer 232 and a database 234 operating "in the cloud", which simply means they could be physically located anywhere with internet access, including being distributed across multiple sites. The server computer 232 may be a single computer, a server cluster, or a distributed virtual server. The term "server" is used to indicate that the system 230 is accessible by multiple users concurrently, and does not impose any limitations on the type of hardware used for the server computer 232. The database 234 is in communication with the server computer 232, and performs operations including storing and retrieving data as commanded by the server computer 232. The server computer 232 and the database 234 may be dedicated to hosting the centralized IoT dashboard system 230, or the system 230 may be hosted as a service by a computing system services company. The system 230 also includes user interface software running on personal computers and mobile devices—for displaying smart device data, setting up and configuring smart devices, managing users and roles for individuals within the company, etc. These features will all be discussed further below.

In addition to the first building 210, the business operates a second building 240 which also has multiple smart devices. The buildings 210 and 240 could both be restaurants which are part of a chain or are operated by a common franchisee, for example. The smart devices in the building 240 communicate their operating parameter data to the centralized IoT dashboard system 230 as indicated by arrow 242, and are in two-way communication with the system 230 as indicated by communication link 244, in the same manner as discussed above with respect to the devices in the building 210. The business could operate other buildings in addition to the buildings 210 and 240, and the business could be in any other industry besides food service, which is merely exemplary.

A user 250 can view data from any/all of the business's smart devices, including devices from multiple manufacturers, in a single mobile app 260. This is in contrast to the user 40 of FIG. 1 who had to use a different mobile app for each smart device. The mobile app 260 can be set up with a "dashboard" view which provides an overview of overall operational status, and/or used to view summary or detailed data for groups of devices. Using the mobile app 260, the user 250 can also send configuration commands (such as changing a set point temperature) to individual ones or groups of the smart devices. The two-way communication between the mobile app 260 and the cloud-based server computer 232 is indicated by communication link 262. The communication link 262 and the other communication links depicted in FIG. 2 may be physically enabled by any wired or wireless communication technology—including but not limited to cellular communication, local and wide area networks including the internet, WiFi, Bluetooth, long-range wide-area network (LoRaWAN), Data Highway Plus (DH+), satellite communication networks, and so forth—as would be understood by those familiar with mobile applications and data acquisition/control systems.

The user 250 may also interact with the system 230 via a web browser 270 running on a personal computer. The web browser interface to the system 230 may be preferable for a system administrator at the business—i.e., someone responsible for adding and configuring devices and sites, adding users and roles, creating device groups and customized widgets for data representing the groups, etc. The two-way communication between the web browser 270 and the cloud-based server computer 232 is indicated by a communication link 272.

Other users 252 and 254 are also shown, each with their own mobile device running the mobile app 260. Each user is identified individually and optionally as a member of a group, and the mobile app 260 is configured according to these identities—which defines what data each user is able to see, what devices (if any) each user is able to configure or control, etc. These user roles and functions are discussed further below.

The centralized IoT dashboard system 230 performs several functions which can be understood from the architecture diagram of FIG. 2. First, the system 230 collects and stores data from the smart devices. This includes the data from the devices 212-218 (and potentially many more) at the building 210, the devices at the building 240, etc. The data includes operating parameter data for each device, and may be processed or unprocessed by the device itself. An example of unprocessed data would be the temperature of a freezer, where each data record might include a device identifier, the temperature reading and a time stamp. An example of processed data would be "door ajar" time per day for a walk-in cooler, where door opening/closing data is aggregated by the device and the cumulative time is calculated and communicated on a daily basis.

Another function performed by the centralized IoT dashboard system 230 is providing flexible visualization of the device data via configurable user interface screens. Examples of these user interface screens—including dashboard screens, individual widgets on the dashboard, configurability of the dashboard, and data drill-down features are provided below.

The centralized IoT dashboard system 230 also provides other features and functions based on individual device capabilities and user roles. For example, the set point temperature of a thermostat or a walk-in cooler may be changeable via the system 230, but this capability may be provided only for certain user roles (such as a site manager). As another example, an oven could be turned on to preheat, but this feature would again be restricted to certain authorized kitchen personnel, for example. Finally, the system 230 includes all of the features and functions necessary for administering the system—such as adding and configuring devices and sites, creating dashboards and widgets, adding users and roles, etc.

As mentioned above, a particularly advantageous application of the centralized IoT dashboard system 230 is for managing smart devices and data for businesses in the food service industry—such as restaurants, catering companies and the like. The centralized IoT dashboard system of the present disclosure provides a software platform for companies and end users to view and manage aggregated information from all of the supported internet-connected devices in an industrial kitchen setting, including devices from multiple manufacturers. A non-limiting list of examples of supported device types include ovens, thermometers, humidity and other sensors, refrigerators, freezers, fryers, kettles, steamers, walk-in coolers, coffeemakers, beverage dispensers, stoves, grills and other cooktops, pizza makers, dishwashers, holding cabinets, line checks, condensing units, utilities, etc.

Each of the device types listed above will have a unique and somewhat different set of parameter data which it measures. Most devices measure temperature, but many devices measure other parameters which are specific to the device type. Table I below includes examples of several types of smart devices that would commonly be used by food service businesses, along with examples of the parameter data which could be measured by each device type and managed in the system 230.

The preceding discussion of FIG. 2 and Table I provide an overview of the capabilities of the centralized IoT dashboard system for managing internet-connected devices and data in a business. Several other figures are discussed below, providing detailed examples of system features and how the features can be used to improve the efficiency of the business's IoT device management.

Figure 3:
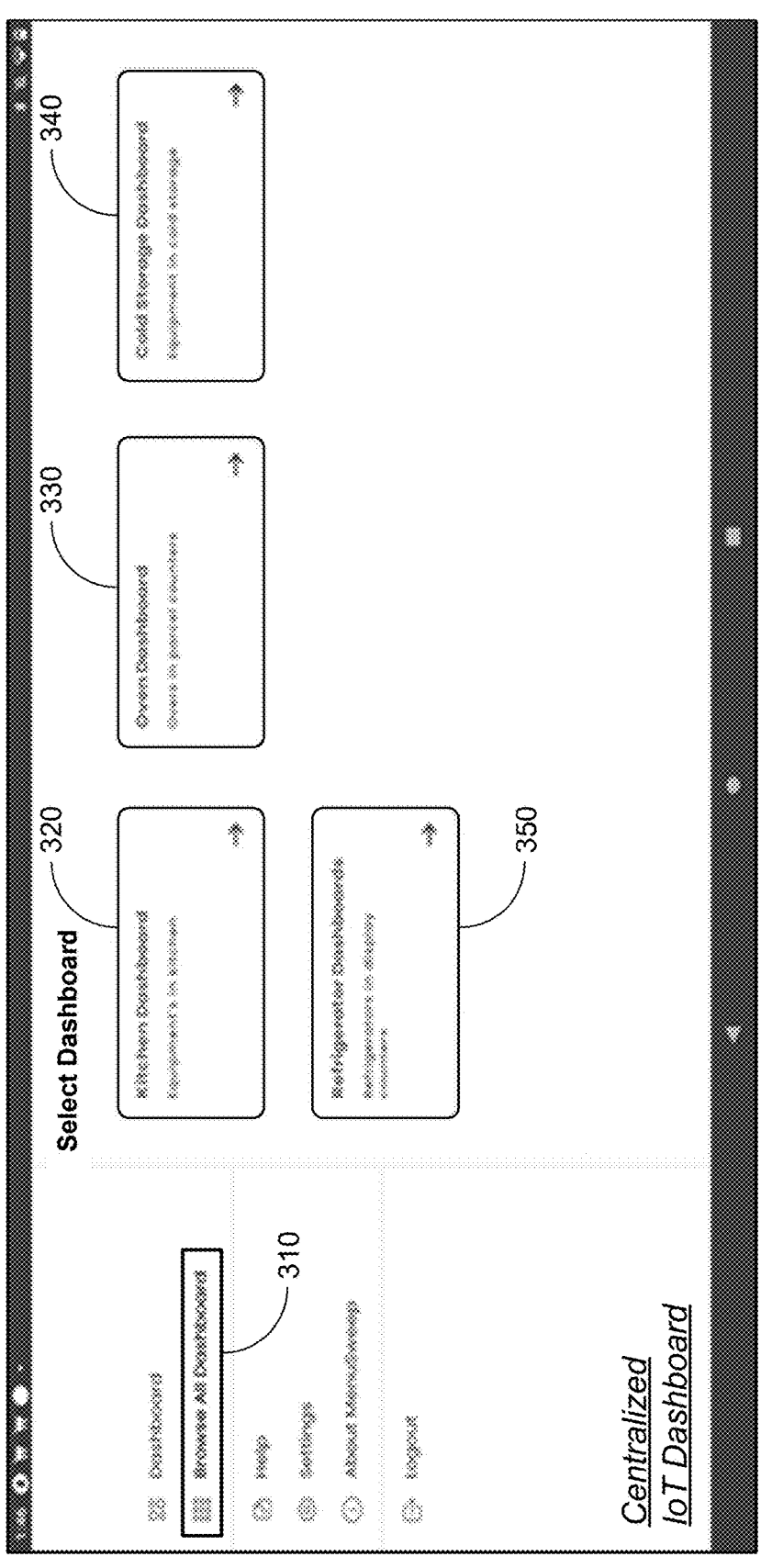
FIG. 3 is an illustration of a user interface screen from the centralized IoT dashboard system, wherein a user can select a specific dashboard for viewing from a set of pre-configured dashboards, according to an embodiment of the present disclosure.

FIG. 3 is an illustration of a user interface screen 300 from the centralized IoT dashboard system, wherein a user can select a specific dashboard for viewing from a set of pre-configured dashboards, according to an embodiment of the present disclosure. The user interface screen 300 could be displayed in the mobile app 260 or the web browser 270 of FIG. 2.

The user interface screen 300 might be a home screen for a store manager or a kitchen manager at a business. The user interface screen 300 is shown in a configuration for browsing all available dashboards, as indicated in a box 310. In this example, the available dashboards include a kitchen dashboard icon 320, an oven dashboard icon 330, a cold storage dashboard icon 340 and a refrigerator dashboard icon 350, each selectable by clicking on the button/icon as shown. Each different dashboard includes data "widgets" for a collection of internet-connected devices which are related in some logical manner, as determined by the business. For example, the oven dashboard would include widgets for all of the ovens in a restaurant. The kitchen dashboard would include widgets for several different types of internet-connected devices in the kitchen of a restaurant. The number of dashboards, their names, and the device widget content of each dashboard is fully configurable by the business—typically by a system administrator.

TABLE I

| DEVICE | | PARAMETERS | | | | |
|---|---|---|---|---|---|---|
| Ovens | Cooking Time | Cooking Temperatures | Cooking Lines | Humidity | Oil Usage | |
| Fryers | Oil Temperatures | Oil Volumes | Filter Quality | Oil Cycle | Oil Quality | Load Size |
| Thermostats | Humidity | Temperature | O2 | CO2 | | |
| Walk-in coolers | Alerts | Door Ajar Time | Cooler Temperature | Usage | | |
| Thermo-couples | Food Temperatures | Alerts | Usage | | | |

The devices listed in Table I represent several general categories—including food preparation appliances (ovens and fryers), food storage units (walk-in coolers), thermostats (for various parts of a building, such as kitchen, dining room, and front lobby), and thermocouples (which are temperature measuring devices which may be used independently of any smart appliances or other smart devices). Each particular device type has a set of parameters which it supports, and as shown, most or all smart device types measure more than just a single parameter. The system 230 and the database 234 are constructed using a data model which supports the different types of parameter data inherent to each type of smart device. The data model is discussed further below.

It is to be understood that the device types and parameters shown in Table I are merely exemplary. Other types of smart devices (walk-in freezers, reach-in refrigerators and freezers, steam tables, etc.—as listed earlier) may be employed by a particular business, and parameters in addition to those shown in Table I above may be monitored.

Figure 4:
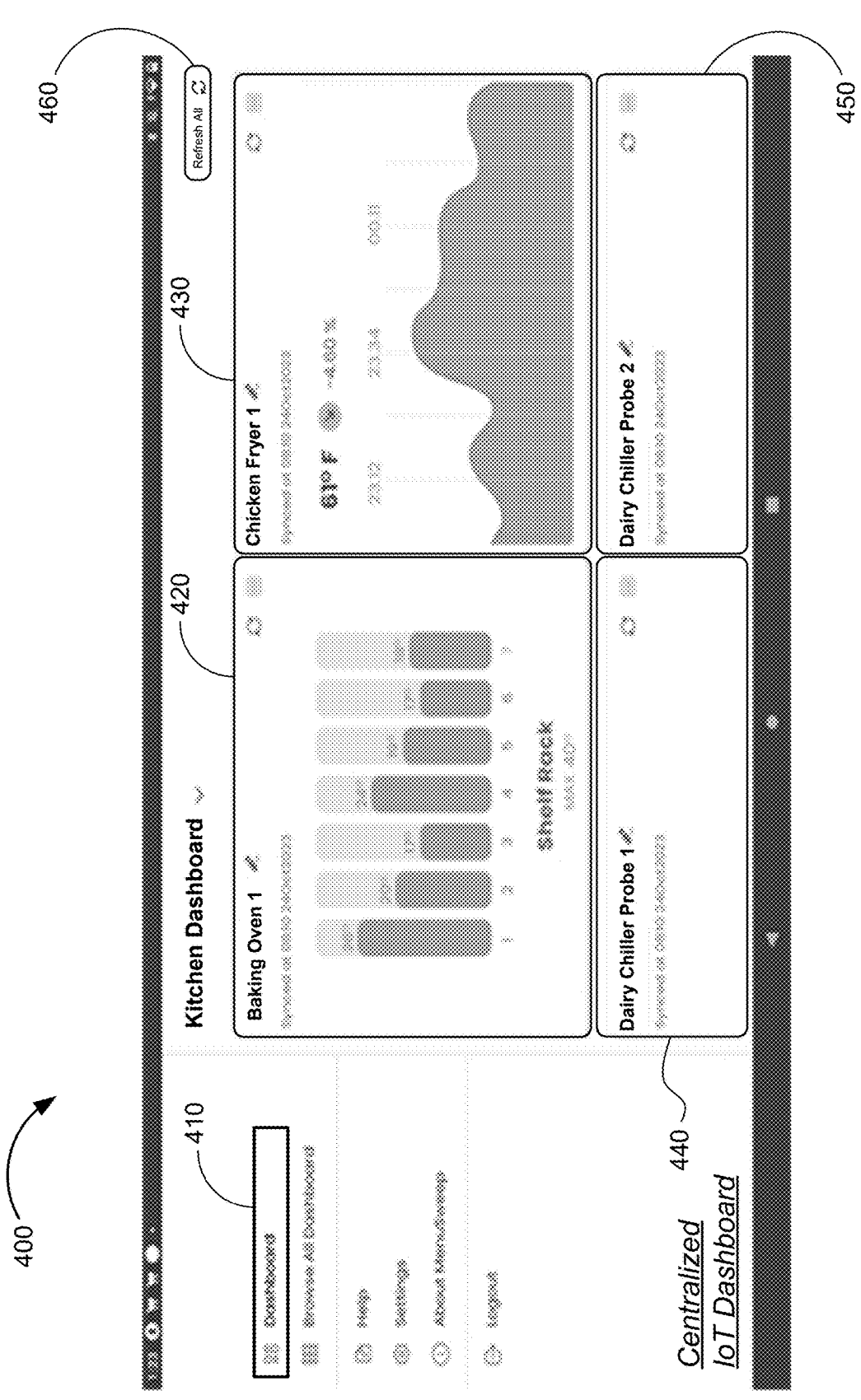
FIG. 4 is an illustration of a user interface screen from the centralized IoT dashboard system, depicting a dashboard selected from the user interface screen of FIG. 3, including a plurality of widgets each displaying data from an IoT device, according to an embodiment of the present disclosure.

FIG. 4 is an illustration of a user interface screen 400 from the centralized IoT dashboard system, depicting a dashboard selected from the user interface screen 300 of FIG. 3, including a plurality of widgets each displaying data from an IoT device, according to an embodiment of the present disclosure. The user interface screen 400 is shown in a configuration for viewing an individual dashboard, as indicated in a box 410. In this example, the user selected the kitchen dashboard icon 320 from FIG. 3.

The kitchen dashboard on the user interface screen 400 includes four widgets, each one representing a different internet-connected device. A widget 420 depicts temperature data for individual racks in an oven in a bar graph format. A widget 430 depicts temperature data for a chicken fryer versus time. Widgets 440 and 450 are only partially visible, but they each depict temperature data for a different dairy chiller which is in use in the kitchen associated with the dashboard of FIG. 4.

Each widget includes some common data elements—including a device name (which is defined by the business), a device manufacturer name (not shown) and a timestamp indicating when the device data was last synchronized. In addition to those common data elements, each widget displays device parameter data in a widget-specific format (line graphs, bar charts, tabular data, numerical readings, etc.).

The kitchen dashboard of FIG. 4 is an example of a pre-configured dashboard available to many or all users in the business. More widgets could be added to the kitchen dashboard than the four shown in FIG. 4. In fact, more than four widgets might already be available on the dashboard, where others would be viewable by scrolling down on the user interface screen 400. The widgets contained on any pre-configured dashboard are determined by the business. Widgets can be added, resized and repositioned on a dashboard as determined to be most suitable. Individual device widgets may appear on multiple dashboards; for example, the oven widget 420 could be used on an oven dashboard in addition to its usage on the kitchen dashboard depicted in FIG. 4.

Each device widget displays sort of a "thumbnail overview" of data for the device. More detailed data for the device can be obtained by clicking on a widget to "drill down". When a widget is clicked on, most or all of the user interface screen will be devoted to a more detailed display of device data. This could include tabular data for all parameters measured by the device, processed data and statistics (e.g., high and low readings, averages, etc.), graphs of parameters, selectable time windows for the graphs and tables, etc.

Refreshing of data in the widgets may be accomplished in a variety of ways. When a dashboard is first displayed (such as by clicking on one of the dashboard icons of FIG. 3), data for all of the device widgets on the dashboard may be refreshed. Alternately, data for one or all device widgets may be refreshed on demand by the user. A Refresh All button 460 synchronizes the data for all of the device widgets on the kitchen dashboard. In addition, a refresh button is available on each individual device widget for situations where refreshing only a single device's data is desired by the user. The concept of refreshing or synchronizing device data is discussed further below.

Figure 5:
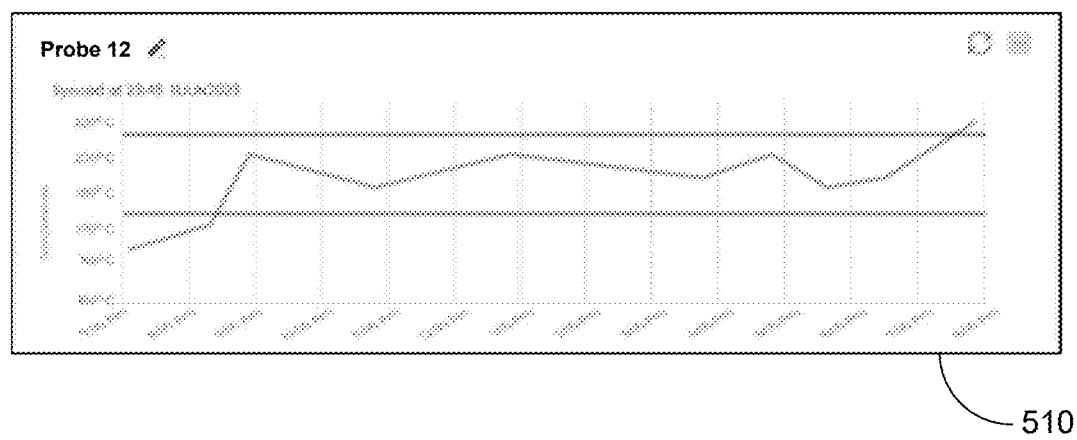
FIG. 5 is an illustration depicting examples of device data widgets available for inclusion on a dashboard of the centralized IoT dashboard system, according to embodiments of the present disclosure.
Figure 5:
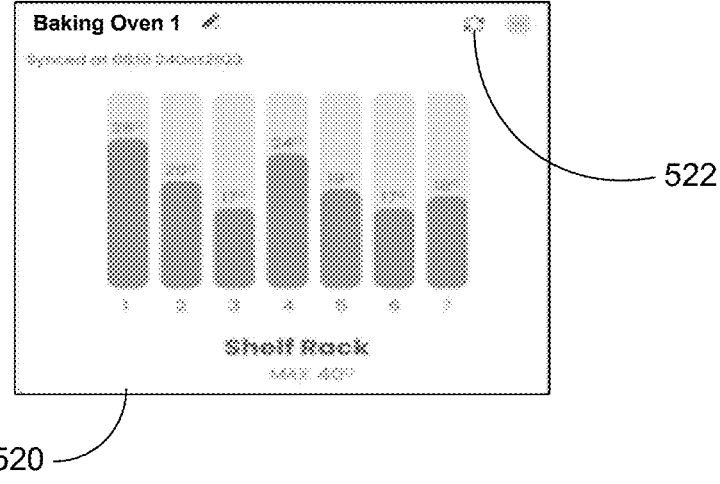
Figure 5:
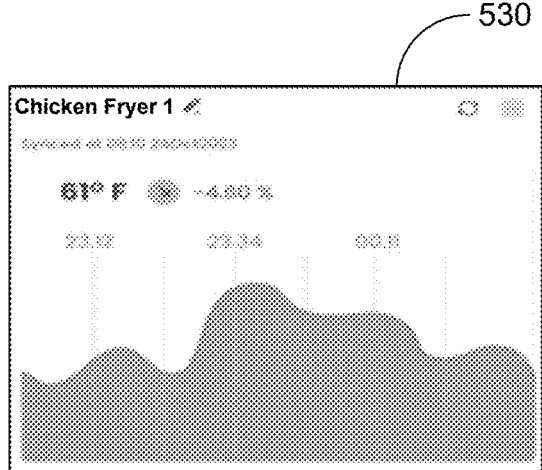

FIG. 5 is an illustration depicting examples of device data widgets available for inclusion on a dashboard of the centralized IoT dashboard system, according to embodiments of the present disclosure. FIG. 5 includes a variety of widgets of different formats and representing different types of internet-connected devices.

A device widget 510 depicts data for a temperature probe. The temperature probe could be a meat thermometer, for example, or any other type of smart thermometer which could be placed in any appliance or other kitchen application. The widget 510 depicts probe data on a time-history graph, along with upper and lower limits (for example, a safe temperature range for heated food or refrigerated food). The widget 510 has a wide format in order to display the temperature data on a graph covering a significant amount of time. A different widget could be created for the same temperature probe, where the different widget could have a different size and shape, a different format of data display (such as numerical display of current and target temperatures), etc.

A device widget 520 depicts temperature data for a number of shelf racks in an oven. The widget 520 displays the temperature data in a bar graph format, with each bar representing a shelf and showing a current temperature value. Each bar also defines a range of allowable or expected temperature readings, with the darker shading of the bar indicating the current temperature value and the lighter shading representing the overall range. Again, several other formats could be chosen for a widget for this particular oven. The widget 520 is a useful widget type for displaying parameter data for an appliance with multiple sub-units (e.g., shelves or racks within the oven).

A device widget 530 depicts temperature data for a chicken fryer on a graph versus time. The widget 530 shows the temperature versus time data on a graph which has a different format and is not as wide as the widget 510, which again illustrates the flexibility in creating widgets of different sizes, shapes and graphical/numeric formats. The widget 530 also includes numerical displays of a current temperature reading and a trend metric (up or down and percentage), which provides another indicator of device performance at a glance.

Each individual device widget includes its own refresh button, an example of which is indicated at 522 on the widget 520 and may also be seen on the widgets 510 and 530. The refresh button may be clicked by the user in order to synchronize or refresh the device data on the widget. The date and time of the last data synchronization is also included on each device widget, as discussed earlier.

The widgets depicted in FIG. 5 are merely exemplary of some types and formats of device widgets. In a typical installation, a system administrator for a business adds internet-connected devices to the business's device library, and each internet-connected device has a widget (or more than one widget) added to a widget library. The widget for a particular internet-connected device may be provided by the device's manufacturer, or a customized widget may be created by the system administrator which depicts the device's data in a format preferred by the business.

Using the widget library, pre-configured dashboards (such as the one shown on FIG. 4) may be created by the system administrator and available company-wide. Some of these dashboards may be restricted to usage only by certain user roles or groups (e.g., management, head chef, etc.). Users may create their own customized dashboards based on personal needs and preferences, where these personalized dashboards may include any widgets which are available to the user. As such, each individual device widget may have role-based access restrictions or may be available to all users in the business.

Figure 6:
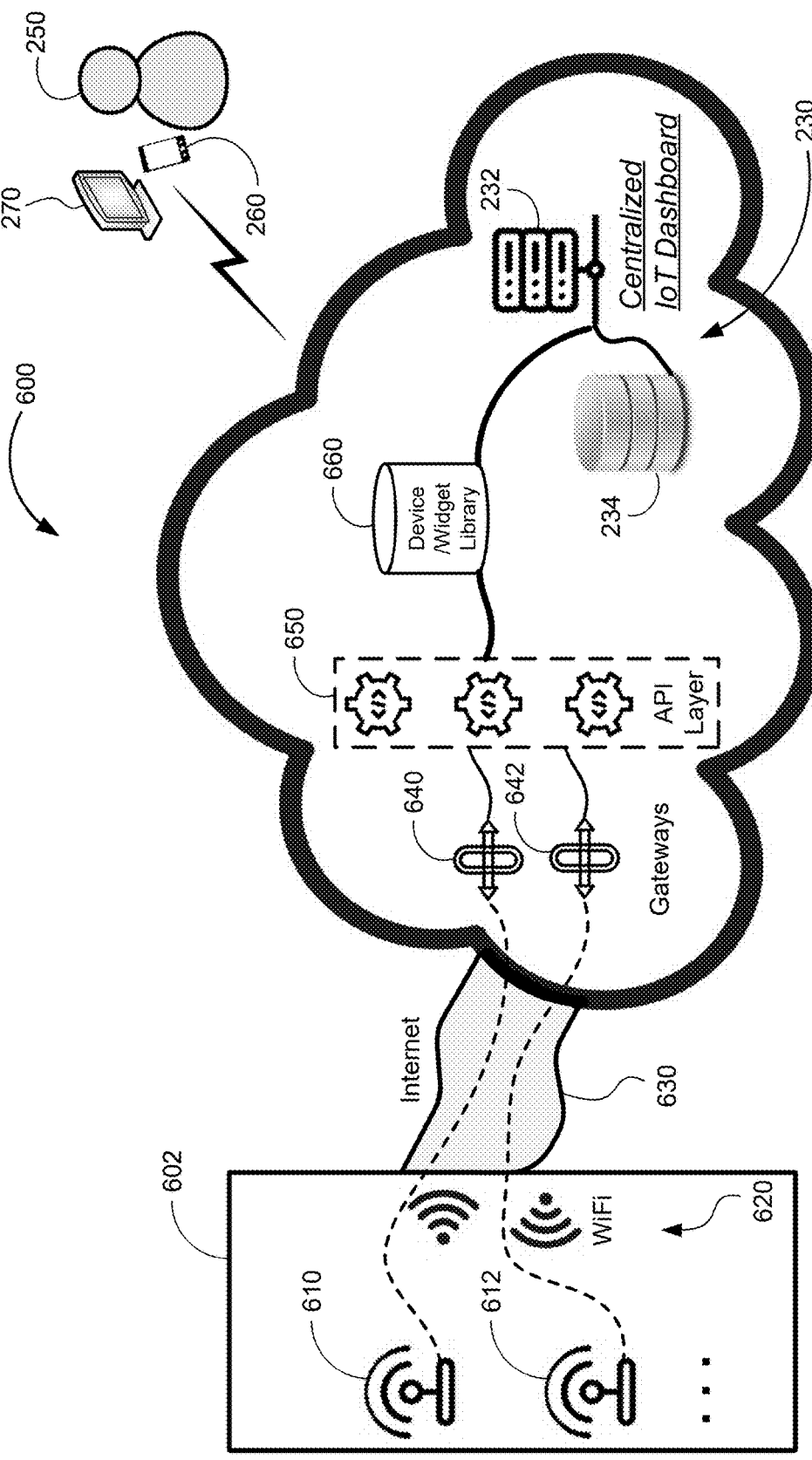
FIG. 6 is a block diagram illustration of an architecture for data communication between various internet-connected devices and the centralized IoT dashboard system, according to an embodiment of the present disclosure.

FIG. 6 is a block diagram illustration 600 of an architecture for data communication between various internet-connected devices and the centralized IoT dashboard system, according to an embodiment of the present disclosure. FIG. 6 illustrates elements, both physical and conceptual, involved in internet-connected device connectivity with the centralized IoT dashboard system. FIG. 6 is not meant to be a technical blueprint for an IT system design, per se.

At the left of FIG. 6 is a building 602 containing multiple internet-connected devices. Two internet-connected devices, 610 and 612, are shown as examples. Many more internet-connected devices could be operating in the building 602, which corresponds with the building 210 of FIG. 2. Continuing with the food service theme, the internet-connected devices 610 and 612 could be a smart oven and a smart refrigerator, for example. The building 602 has a WiFi network 620 hosted on one or more routers in communication with an internet connection 630. Any device which is registered on the WiFi network 620 thereby has two-way internet communication capability, as known in the art.

In FIG. 6 and other figures of the present disclosure, WiFi is depicted and described as the communication channel from the internet-connected devices to the internet and vice versa. However, it is to be understood that this is merely a non-limiting example, and any other communication technology may be employed which provides suitable connectivity between the internet-connected devices and the centralized IoT dashboard 230. This includes but is not limited to; cellular communication, local and wide area networks including the internet, WiFi, Bluetooth, long-range wide-area network (LoRaWAN), Data Highway Plus (DH+), satellite communication networks, and so forth—as would be understood by those familiar with mobile applications and data acquisition/control systems. In addition, communications between the user devices (mobile devices and/or personal computers) and the centralized IoT dashboard 230 may likewise use any suitable communication technology—including communication via local and wide area networks, broadband, cellular communication networks, satellite transmissions, and all equivalents.

In the cloud of FIG. 6 are two gateways, 640 and 642. Gateways are internet-based interface services provided by the device manufacturers for enabling internet access to smart device data. The gateways are conventionally used to communicate between the manufacturer's smart devices and manufacturer-specific mobile apps, which was the concept shown in FIG. 1 and discussed earlier. However, the gateways can also be used as an interface or communication pipeline to pass device data into a proprietary application, which in this case is the centralized IoT dashboard system 230. A gateway can be either a piece of hardware or software connected to devices.

Consider a case where the internet-connected device 610 is from a first manufacturer and the internet-connected device 612 is from a second manufacturer. The gateway 640, provided by the first manufacturer, communicates with the internet-connected device 610 using a protocol which may be proprietary to the first manufacturer. Likewise, the gateway 642, provided by the second manufacturer, communicates with the internet-connected device 612 using a protocol which may be proprietary to the second manufacturer. If a particular business has internet-connected devices from several different manufacturers, then a gateway for each manufacturer's devices is needed. On the other hand, if the business has several different internet-connected devices from one particular manufacturer, then one gateway provides the interface to all of that manufacturer's devices at the business.

Rather than each manufacturer's devices communicating with their own manufacturer-specific mobile app as in FIG. 1, the centralized IoT dashboard system 230 (using the reference number from FIG. 2) provides centralized access to device data from any and all device manufacturers. An API layer 650 includes a set of software utilities to enable communication between the system 230 and each of the manufacturer's device data gateways. An application programming interface (API) is a connection between computers or between computer programs—a type of software interface, offering a service to other pieces of software. Using the capabilities of the API layer 650, each of the internet-connected devices 610 and 612 (and others) may be uniquely identified and registered in the system 230. Each internet-connected device possesses its own unique device identifier—which enables internet-based communication from the smart device to its manufacturer-specific gateway, through the API layer 650, to the IoT dashboard system and database. Not all internet-connected devices have their own API. More sophisticated internet-connected devices (with two-way interfaces and multiple measurement parameters) typically do have an API, while simpler devices may just have a network address and a location within the device where a reading (e.g., a temperature reading) can be found.

Once the device 610, for example, is identified and registered in the system 230, it is selectable as a device (with a corresponding widget) in a device/widget library 660. Parameter data from the device 610 is then available in the database 234 and for processing by the server computer 232 (shown previously in FIG. 2). In other words, data from the device 610 may be displayed in a widget (as in FIG. 5) on a dashboard (as in FIG. 4), alongside data from other manufacturers' internet-connected devices. Commands and instructions, such as changing a set point temperature or resetting a device, can also be sent to the device 610 or the device 612 by the system 230, to the extent that each individual device supports such functionality.

Using the elements and functions discussed above, a company can integrate data from internet-connected devices from many manufacturers into the IoT dashboard system and database. The company's internet-connected devices may be located at a single facility or in multiple facilities. The user 250 can then use the mobile app 260 or the web browser 270 (shown previously in FIG. 2) to view and configure the dashboards and data as desired. This ability to view, configure and control internet-connected devices from multiple manufacturers in a single mobile app represents a significant improvement over existing manufacturer-proprietary data viewing apps.

FIG. 6 illustrates the fundamental concepts of smart device interconnectivity with the centralized IoT dashboard system according to embodiments of the present disclosure. Various changes may be made to the elements and connectivity without departing from these fundamental concepts—which are that the smart devices in a business location communicate data over the internet to their manufacturer gateways, where the data and instructions for the devices may be selectively imaged into the dashboard system database. With two-way communication established between each internet-connected device and the centralized IoT dashboard system, device data may be displayed and device instructions sent using the system in the manner described throughout the present disclosure.

Figure 7:
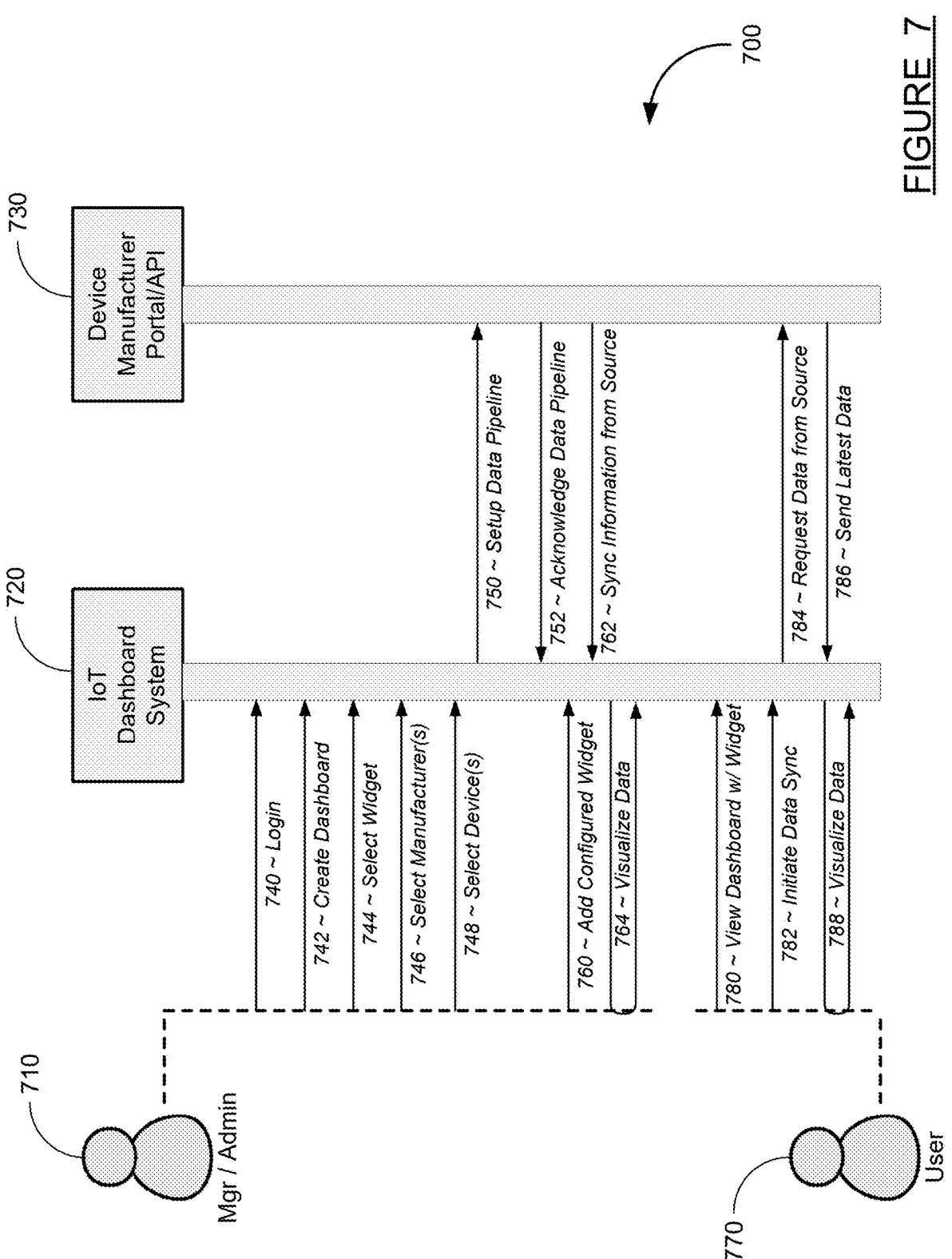
FIG. 7 is a data flow diagram depicting a flow of commands and data for a system administrator adding internet-connected devices to a database and a user viewing data for the devices in the centralized IoT dashboard system, according to embodiments of the present disclosure.

FIG. 7 is a data flow diagram 700 depicting a flow of commands and data for a system administrator adding internet-connected devices to a database and a user viewing data for the devices in the centralized IoT dashboard system, according to embodiments of the present disclosure. A manager or system administrator 710 with system configuration authority is shown at the top left of FIG. 7. The centralized IoT dashboard system is indicated at a box 720, including the vertical bar descending below the box. This is the system 230 shown and described earlier with respect to FIGS. 2 and 6. A device manufacturer portal and the associated API layer are indicated at a box 730, also including the vertical bar.

The system administrator 710 must first authenticate or login to the IoT dashboard system 720, as indicated by a step 740. Then at step 742, the system administrator 710 creates a dashboard in the system 720. The step 742 is only necessary if a new dashboard is needed. In some cases, a new smart device is added to the system 720 and included on an existing dashboard. At a step 744, the system administrator 710 selects a widget type or template to use for the new smart device which is being added to the system database. For example, a bar graph widget having the features of the widget 520 (FIG. 5) may be selected.

At a step 746, the system administrator 710 selects a device manufacturer from a list of available manufacturers.

Many different smart device manufacturers are supported in the system 720, using the manufacturer device gateways and the API layer shown in FIG. 6 and discussed earlier. After selecting a manufacturer, at step 748 a particular device is selected. The device ID is known by the site manager or system administrator 710, as the device will have been installed in a facility operated by the company.

At a step 750, the system 720 communicates with the device manufacturer portal 730 (through the API layer), with a request to set up a "data pipeline" for the particular device having the designated device ID. At a step 752, the manufacturer portal 730 responds to the system 720, acknowledging the establishment of the data pipeline for the particular smart device. This creates an enduring two-way data pipeline between the smart device and the centralized IoT dashboard system 720, enabling device parameter data to be loaded into the system 720 and commands/instructions to be sent from the system 720 to the smart device.

At a step 760, the configured device widget is added to the widget database in the system 720. This makes the device widget available for inclusion on dashboards. When the widget is used or added to a dashboard and triggers a synchronization request, the device parameter data is synchronized from the source (the device, through the portal 730) at a step 762. At a step 764, the site manager or system administrator 710 visualizes the data, and preferably confirms that the data displayed in the widget of the system 720 corresponds accurately with the actual known status of the device in the facility (e.g., if the smart device is an oven, it is confirmed that the temperature displayed in the widget of the system 720 matches the temperature displayed on the control panel of the oven). This completes the setup of a new smart device in the database of the system 720. This process would of course be repeated for each smart device used by the company.

A user 770 of the centralized IoT dashboard system 720 is shown at the bottom left of FIG. 7. The user 770 has the mobile app for the system 720. At a step 780, the user 770 views a dashboard containing one or more widgets, such as the device widget which was established in the steps 740-764 discussed above. At a step 782, the user initiates a data synchronization, such as by clicking on the widget's synchronize/refresh button, or the dashboard's synchronize/refresh all button. At a step 784, the synchronization request is sent from the system 720 to the manufacturer portal 730. At a step 786, the latest device parameter data is sent from the device through the manufacturer portal 730 to the system 720 and displayed in the mobile app. At a step 788, the user 770 views the data for the device in the mobile app of the system 720.

After the user 770 has used the centralized IoT dashboard mobile app once or twice, the steps 780-788 may involve nothing more than glancing at the user's mobile device displaying a favorite dashboard. In some embodiments of the centralized IoT dashboard system 720, each user must be identified by a unique userID and password, and is given appropriate device viewing and configuration capabilities by a system administrator. These user configuration and authentication steps are not shown in FIG. 7 for the sake of simplicity.

It can be readily understood from the discussion of the preceding figures how the centralized IoT dashboard system 720 operates in a multi-manufacturer device environment, supporting the needs of many different users in a company. For example, any individual user may have a dashboard with widgets representing devices made by several different manufacturers. If this user clicks on the "synchronize/ refresh all" button on the dashboard, each device widget will send a request through its corresponding manufacturer portal to retrieve the latest device data, and the latest data for all of the devices will momentarily be displayed on the dashboard in the user's mobile app. Data from any individual smart device may be viewed by many different users simultaneously on a variety of different dashboards.

Figure 8:
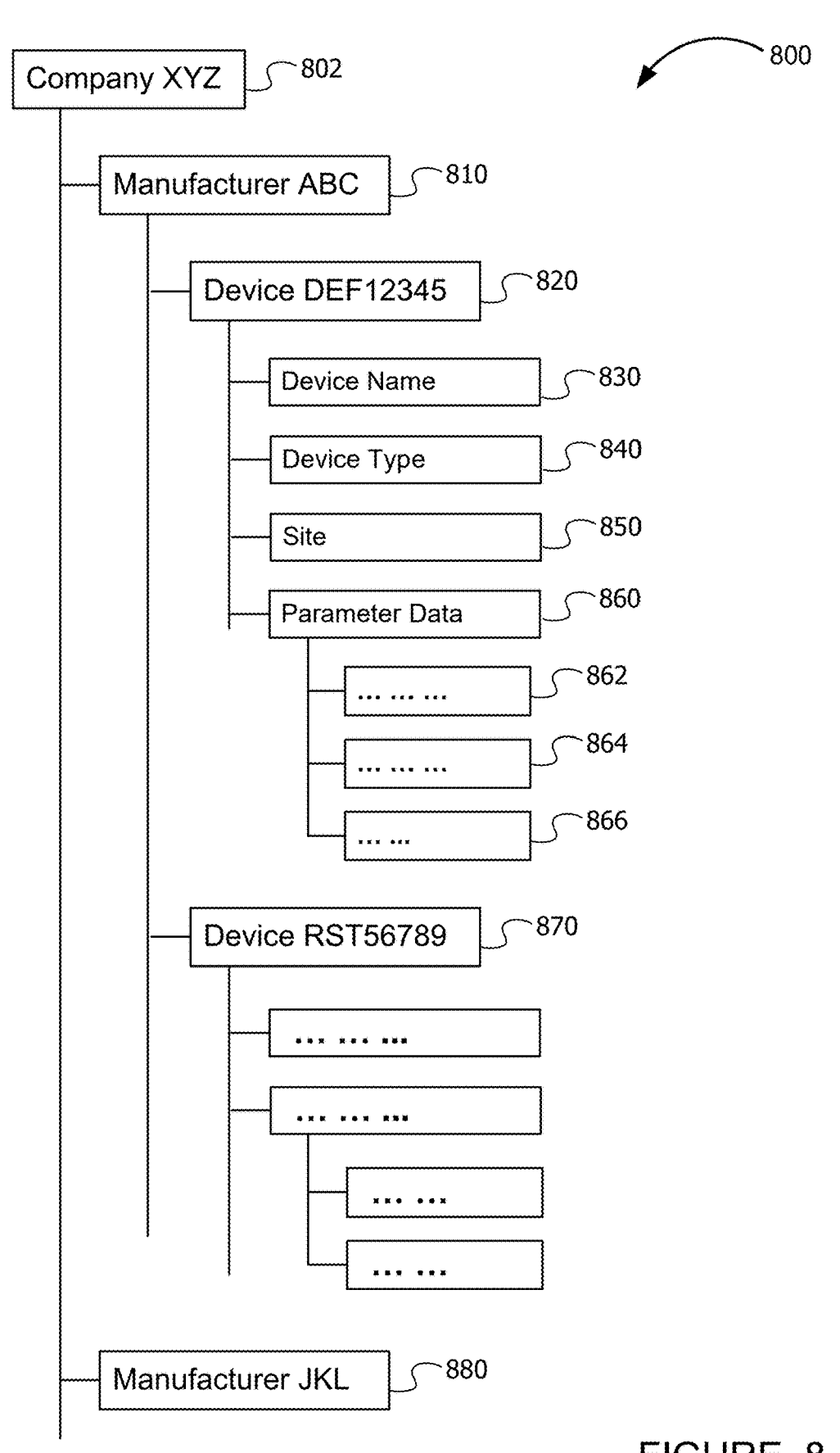
FIG. 8 is data hierarchy diagram illustrating how data for multiple internet-connected devices from multiple manufacturers is managed in the centralized IoT dashboard system, according to an embodiment of the present disclosure.

FIG. 8 is data hierarchy diagram 800 illustrating how data for multiple internet-connected devices from multiple manufacturers is managed in the centralized IoT dashboard system, according to an embodiment of the present disclosure. At the top of FIG. 8 is a company 802 ("Company XYZ"). The company 802 is the company which has implemented the centralized IoT dashboard system in its business (e.g., a food services business). All of the data shown underneath the company 802 in FIG. 8 is visible only to the company 802 in the centralized IoT dashboard system. Other companies using the centralized IoT dashboard system have their own data which is partitioned so that one company cannot view another company's device data.

A manufacturer 810 ("Manufacturer ABC") is a manufacturer of devices used at the company 802. Referring back to FIGS. 6 and 7, the manufacturer 810 would be set up with its interface gateway, so that devices from the manufacturer 810 can be used in widgets for the company 802. Under the manufacturer 810 is a device 820. The device 820 is a smart device made by the manufacturer 810. The device 820 has a unique device ID, as discussed earlier. The device 820 has several device attributes—including a device name 830 (given by the company 802 so as to be recognizable to users), a device type 840 (such as a model of oven), and a site name 850 (also given by the company 802, such as "Main St. Restaurant"). The device 820 also includes parameter data 860, which may in turn include several data fields 862, 864, 866, etc. Each type of smart device may have a different number of parameter data fields, as shown earlier in Table I.

A device 870 is a second smart device under the manufacturer 810. The device 870 has its own attributes and device data, as shown conceptually in FIG. 8. Other smart devices may also be included under the manufacturer 810, if the company 802 has installed more such devices by the manufacturer 810.

A manufacturer 880 is second manufacturer from which the company 802 has implemented smart devices in the centralized IoT dashboard system. The manufacturer 880 would have one or more smart devices under it in the data diagram 800, in the same manner as the manufacturer 810. Other manufacturers, each with one or more smart devices, could also be included in the data diagram 800. It should be apparent that any number of device manufacturers and any number of smart devices from each manufacturer can be included in the centralized IoT dashboard system for the company 802, and likewise for other companies that implement the system.

The data model of FIG. 8 may be extended to include other data and metadata elements. One example of this deals with the topic of access privileges. Access control may be applied at the dashboard, widget and/or data element level. At each of these levels, access control may be defined for "read" functions (viewing data) and "write" functions (controlling a device). These access capabilities may be assigned to groups (e.g., kitchen staff, building manager, etc.) and/or to individuals (e.g., "Kate Smith") as determined by the needs of the business and as defined by the system administrator(s).

The data model depicted in FIG. 8 is merely an example of one possible embodiment, showing how key relationships between data fields and records are established. Other data models may be used as deemed suitable—such as where the manufacturer is an attribute of the device, rather than the device being an element belonging to the manufacturer. In any case, the centralized IoT dashboard system may be deployed at many different companies, each company may have multiple sites or facilities, the company may have installed many smart devices from many different device manufacturers, and the system provides convenient and flexible display of the company's smart device data to any authenticated user of the mobile app.

The centralized IoT dashboard system should be understood to include other features typical of mobile applications, in addition to those explicitly discussed above. For example, individual users authenticate into the mobile app using a user ID and password, with Face ID or other biometric security features optional. Users may define settings for the app, including settings for push notifications among others. Individuals typically belong to groups defined by the business, and data access is correspondingly controlled. UserIDs, groups, data access, device and widget availability, pre-configured dashboard and other features are managed by a system administrator. These features are available for companies to use, or not use, at their discretion.

Another feature of the centralized IoT dashboard system is setting operational ranges for a device which are used for triggering the sending of push notifications (to users who have enabled the notifications) when the device has an operating parameter which is out of range. Setting ranges and sending push notifications may be handled entirely within the centralized IoT dashboard system, without the need to send commands through the manufacturer gateways to individual devices.

In addition, as mentioned earlier, it is possible to send command instructions through manufacturer gateways to smart devices—either individually or in groups (such as all ovens). These commands include instructions such as changing a set point temperature of a freezer or turning a smart device on or off.

In addition to outputting parameter data, some of the internet-connected devices (of FIGS. 2 and 6) provide notification of an alarm (of a parameter out of range, for example), a reorder point (indicating low stock of food products or other consumables), or a periodic maintenance event upcoming for a device. Another feature of the centralized IoT dashboard system is to receive these types of notifications from the IoT devices in the company's facilities, generate the task(s) associated with the remedy and insert the task assignments into a task management software system (which may be an affiliated product integrated with the centralized IoT dashboard system). This task integration provides a valuable service as it ensures that whatever the mechanism of action to trigger the alarm/notification, the dashboard system not only provides easy and early viewing of said alarm/notification but also assigns the proper task to the proper personnel to remedy the alarm/notification.

In a company with many internet-connected devices, a large amount of parameter data will be contained in the database of the centralized IoT dashboard system. It may be desired by a business to perform their own in-depth analysis of business performance metrics using the device parameter data—such as analyzing a correlation between food spoilage and walk-in refrigerator temperature data. To support this sort of business need, any of the data in the IoT dashboard system database may be downloaded for offline use. The downloads may be into a spreadsheet or comma separated value file, for example. Data downloads may be performed for individual devices or groups of devices (based on device type or manufacturer, or per individual site, for example).

To summarize, the system of the present disclosure provides a "one-stop shop" dashboard for all of the IoT devices in a company, including devices from many different manufacturers. Viewing the data in dashboard format in the mobile app helps different personas in the kitchen or business to comprehend data from multiple sources by visualizing data via a broad spectrum of data visualization tools and performing operations as required.

As will be well understood by those skilled in the art, the several and various steps and processes discussed herein to describe the disclosed methods and system may be referring to operations performed by a computer, a processor or other electronic calculating device that manipulates and/or transforms data using electrical phenomenon. In particular, this refers to the server computer 232, and the mobile device and the personal computer shown in FIG. 2, along with the smart devices themselves, manufacturer gateways and other computing devices. Those processors and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media. In particular, the server computer 232 is understood to be configured to run the centralized IoT dashboard system as described, including all of the required interaction with smart devices and gateways, and the serving of the data which is displayed in the mobile app running on various user mobile devices.

Further, the server computer 232, the various internet-connected devices and the mobile devices described above are understood to be in communication with each other via any suitable wired or wireless communication channel for the sharing of application screens, input data, output data, etc. This includes Internet communication via local and wide area networks, broadband, cellular communication networks, satellite transmissions, and all equivalents. The transmission of electronic signals from one computing device to another, and the corresponding actions taken by the receiving computing device, are all inherent to the presently disclose IoT dashboard system and methods.

Using the methods and system disclosed above, storage and viewing of IoT device data can be handled in an easy and efficient manner for all employees in a food service business. The ability for parameter data from multiple manufacturers' smart devices to be viewed in a single mobile app represents a major improvement over existing apps which display only a single manufacturer's smart device data.

The foregoing discussion describes merely exemplary embodiments of the present disclosure. One skilled in the art will readily recognize from such discussion and from the accompanying drawings and claims that various changes, modifications and variations can be made therein without departing from the spirit and scope of the invention as defined in the following claims.

What is claimed is:

1. An internet-connected devices display system comprising:

a server computer comprising a processor, a memory module, a database and internet connectivity; and a plurality of user devices each running an application in internet communication with the server computer, wherein the server computer is configured with software to perform two-way communication with, and storage of parameter data from, a plurality of internet-connected devices from a plurality of device manufacturers, the internet-connected devices are located at a plurality of site locations of a company, each of the site locations having a site name and each of the device manufacturers having a device manufacturer name;

the server is configured to perform steps of:

establishing two-way communication between the server computer and each of the internet-connected devices, comprising identifying a manufacturer of a particular internet-connected device of the internet-connected devices, establishing access from the server computer to an internet-based interface gateway operated by the manufacturer, selecting the particular internet-connected device and creating an enduring two-way communication channel between the server computer and the particular internet-connected device using an application programming interface for the particular internet-connected device;

importing the parameter data from each of the internet-connected devices into the database on a scheduled periodic basis or upon occurrence of a triggering event;

displaying the parameter data for the internet-connected devices on a user interface of the user devices, comprising displaying the parameter data for each of the internet-connected devices in a device widget, and providing a set of pre-configured dashboards each comprising a plurality of the device widgets of the internet-connected devices from the plurality of device manufacturers, each of the device widgets comprising at least the device manufacturer name and the site name of the corresponding internet-connected device along with the display of the parameter data; and sending an instruction from the server computer to an individual one of or a group of the internet-connected devices, wherein the instruction changes an operating condition setting of the individual one of or the group of the internet-connected devices, wherein the instruction is entered by an authorized user of one of the user devices.

2. The system according to claim 1 wherein the internet-connected devices comprise one or more of ovens, thermometers and other parameter sensors, refrigerators, freezers, fryers, kettles, steamers, walk-in coolers, coffeemakers, beverage dispensers, stoves, grills and other cooktops, pizza makers, dishwashers, holding cabinets, and condensing units.

3. The system according to claim 1 wherein the parameter data from the internet-connected devices comprises temperature data.

4. The system according to claim 1 where the triggering event is from a group including a data refresh request by a user of one of the user devices and a parameter having a value outside an allowable range.

5. The system according to claim 1 wherein the device widgets are configurable to display the parameter data in formats comprising bar graphs, line graphs and numerical tables, the device widgets are further configurable to comprise allowable parameter value ranges, and the device widgets comprise a button for refreshing the parameter data from a corresponding internet-connected device.

6. The system according to claim 5 wherein the device widgets further comprising a device name.

7. The system according to claim 1 wherein at least one of the pre-configured dashboards comprises device widgets for internet-connected devices from more than one manufacturer.

8. The system according to claim 1 wherein certain ones of the device widgets and the dashboards comprise access control attributes which designate individuals or groups within a company with viewing privilege.

9. The system according to claim 1 wherein the server computer is further configured to send push notifications to selected ones of the user devices.

10. The system according to claim 9 wherein the push notifications indicate one or more of the internet-connected devices has parameter data outside an allowable range, that one or more of the internet-connected devices has an upcoming required maintenance event, or that one or more of the internet-connected devices requires a re-order of a stock item.

11. The system according to claim 10 further comprising creating a task entry, defining the upcoming required maintenance event or the required re-order of a stock item, in a task management system.

12. The system according to claim 1 wherein the user devices comprise mobile devices running a mobile application configured to operate as part of the internet-connected devices display system, and computers running a web browser application.

13. The system according to claim 1 wherein the server computer is further configured for exporting the parameter data from the database to a file or to a data analysis application.

* * * * *